US007956760B2

(12) United States Patent
Hill

(10) Patent No.: US 7,956,760 B2

(45) Date of Patent: Jun. 7, 2011

(54) MOISTURE SENSING STRIPS

(76) Inventor: Clyde D. Hill, Lacey, WA (US)

( * ) Notice: Subject to any disclaimer, the term of this patent is extended or adjusted under 35 U.S.C. 154(b) by 58 days.

(21) Appl. No.: 12/460,343

(22) Filed: Jul. 18, 2009

(65) Prior Publication Data

US 2009/0284382 A1 Nov. 19, 2009

Related U.S. Application Data

(63) Continuation-in-part of application No. 11/386,541, filed on Mar. 21, 2006, now abandoned.

(60) Provisional application No. 60/667,884, filed on Apr. 1, 2005.

(51) Int. Cl.
*G08B 21/00* (2006.01)

(52) U.S. Cl. ........................................ 340/604; 340/605

(58) Field of Classification Search .................. 340/603, 340/604, 605

See application file for complete search history.

(56) References Cited

U.S. PATENT DOCUMENTS 2,874,695 A 2/1959 Vaniman
3,460,123 A 8/1969 Bass
4,191,950 A * 3/1980 Levin et al. .................. 340/604
4,374,379 A 2/1983 Dennison, Jr.
4,502,044 A * 2/1985 Farris et al. .................. 340/604
5,188,143 A 2/1993 Krebs
5,192,932 A 3/1993 Schwab, Jr.
5,790,036 A 8/1998 Fisher et al.
5,808,554 A * 9/1998 Shuminov .................... 340/604
5,992,218 A 11/1999 Tryba et al.
6,731,215 B2 5/2004 Harms et al.

* cited by examiner

*Primary Examiner* — Travis R Hunnings
(74) *Attorney, Agent, or Firm* — Brian J. Coyne

(57) ABSTRACT

A water leakage monitoring and response system for residential and commercial use. A flexible, elongated moisture sensor strip for placement on a floor or adjacent a baseboard or plumbing fixture comprises flexible upper and lower wires separated by a water permeable, nonconductive layer, and nonconductive upper and lower layers that extend away from the wires to form margins for attaching the strip to a surface and for wicking moisture toward the wires. Alternatively, the wires are laterally spaced-apart within the strip and/or the strip assumes the form of a pad to cover a surface area. In use, a plurality of strips/pads are wired to input jacks of a battery-powered electronic interface unit that provides audible and visual signals when moisture shorts the wires in the strips/pads. The unit also provides audible warning of low-battery power and can signal a home security system when a leak is detected.

6 Claims, 9 Drawing Sheets

10
24
28
14
12
22
20
26
24
28
21
18
1B
1B
14

10
18
12
16
14
20

MOISTURE SENSING STRIPS

CROSS REFERENCE TO RELATED APPLICATIONS

This application claims the benefit of U.S. provisional patent application No. 60/667,884 by the same applicant with filing date Apr. 1, 2005, and is a continuation in part of U.S. patent application Ser. No. 11/386,541, filed on Mar. 21, 2006 now abandoned.

STATEMENT REGARDING FEDERALLY APPROVED RESEARCH OR DEVELOPMENT

None.

BACKGROUND OF THE INVENTION

1. Field of the Invention

This invention relates to warning or alarm systems and, more particularly, to an electrical device for use in signaling the presence of unwanted substances such as liquids near sensitive electrical equipment. This invention further relates to such systems that are capable of automatically shutting off electrical power to electrical equipment when liquid is sensed in the vicinity of the electrical equipment.

2. Background Art

U.S. Pat. No. 5,790,036 to Fisher et al disclosed an apparatus for detecting the presence of electrically conductive fluids, including urine and other body fluids such as exudate from wounds. The apparatus included a pair of spaced-apart electrodes covered by absorbent material, together with a housing containing a signaling device which produced a palpable vibration, a sound, a light, or a radio signal when fluid in the absorbent material provided a conductive path between the electrodes.

U.S. Pat. No. 2,874,695 to C. A. Vaniman disclosed an enuresis napkin assembly adapted to be worn upon the body of a sleeping child to wake the child in the event of any involuntary voiding of his bladder. The assembly comprised a self-contained power pack in electrical circuit with a vibrator and a napkin having a pair of juxtaposed electrodes spaced from each other by a moisture absorbent insulator. The electrodes and insulator were so arranged that the absorbent insulator were wetted by even a small discharge of urine.

U.S. Pat. No. 5,192,932 to Schwab disclosed a device for sensing the presence of liquids or other substances and warning of potential hazards. The device included a thin, flexible mat constructed of metalized sheets and included conductive and non-conductive portions and a sensitivity layer for adjusting the sensitivity of the mat. The device further included monitoring means for sensing changes in the electrical property of the mat and means to electrically connect the mat to the monitoring means. Upon sensing a change in the electrical properties of the mat, a warning device was activated by the monitoring means and the monitoring means deactivated the electrical equipment. The mat could be cut to change the size and shape.

U.S. Pat. No. 5,188,143 to Krebs disclosed a water leakage detector sensitive to the presence of moisture and adapted for installation around any cylindrical or other shaped water vessel. The detector had an elongated, flexible sensing strip comprising a pair of conductors separated by insulation. Each conductor included an electrode coupling with a wire lead extending via a cable to an electrical plug. A circuit housing was provided having an audible alarm operably connected to an electrical socket adapted to detachably connect with the plug.

U.S. Pat. No. 5,992,218 to Tryba et al. disclosed a water leakage protector apparatus for appliances subject to leakage. The apparatus included a first device for detecting water leakage from the water supply line coupled to the appliance and a second device for detecting water leakage from the appliance itself. A control apparatus was coupled to a valve, affixed to the water supply line, to control water flowing to the appliance, and the control apparatus was connected to a source of electrical power. The appliance was connected to the control apparatus to obtain electrical power for operation. The first and second sensing devices were coupled to the control apparatus so that when a water leak was detected by either the first or the second detecting device the control apparatus stopped the water from flowing in the water supply line and interrupted electrical power to the appliance.

U.S. Pat. No. 6,731,215 to Harms et al. disclosed a leakage response system for an appliance. A sensor was provided that included a mat that was constructed of top and bottom outer layers of electrically conductive fabric separated by a central nonconductive fabric layer, and a pair of fusing layers fusing the top and bottom layers to the central nonconducting layer. The sensor could also include a pair of conductive pins for installation into a surface for detecting moisture hidden within the surface. An alternate sensor mat included a pair of apertured foil conductive layers separated by a nonconductive layer, and a pair of fusing layers fusing the foil conductive layers to the top and bottom nonconductive absorbent layers.

SUMMARY OF THE INVENTION

The present invention provides a water leakage monitoring and response system adapted for residential and commercial use. In a typical installation, the system is designed to detect water leaks within a building that accumulate on a floor or adjacent to a baseboard near floor level. The system comprises a flexible, elongated, moisture sensing strip. In a first embodiment, the strip includes:

(a) a flexible, upper wire;

(b) a flexible lower wire parallel to the upper wire;

(c) a water permeable, nonconductive middle layer interposed between the upper and lower wires that becomes conductive only when wet;

(d) a nonconductive upper layer that overlies the upper wire; and (e) a nonconductive lower layer parallel to the upper layer that underlies the lower wire;

wherein the upper, middle and lower layers are attached to each other by longitudinal stitching (or the equivalent) on opposite sides of the wires and extend laterally away from the wires to form a first margin for attaching the strip to a baseboard or other suitable surface, and a second margin for wicking moisture from the floor into the portion of the nonconductive layer that separates the wires. Each margin can be used as both an attachment and a wicking margin, as needed. In a second, alternate embodiment, instead of an upper and a lower wire, a parallel pair of laterally spaced-apart wires is provided. Thus, in a second embodiment, the strip includes:

(a) a first flexible wire;

(b) a second flexible wire laterally spaced-apart from the first wire;

(c) a nonconductive, water permeable upper layer that overlies the wires and becomes conductive when wet; and (d) a nonconductive, water permeable lower layer that underlies the wires and that becomes conductive when wet;

wherein the upper and lower layers are attached to each other by longitudinal stitching (or the equivalent) on opposite sides of the wires and extend laterally away from the wires to form a first margin for attaching the strip to a baseboard or other suitable surface, and a second margin for wicking moisture from the floor into the portion of the nonconductive layers that underlie and overlie the wires. Again, each margin can be used as both an attachment and a wicking margin, as needed. In use, the strips are cut to whatever length is required for attachment to pipes, placement underneath plumbing fixtures such as sinks, and other appliances that can either leak water or whose operation should be shut down in the event of a water leak in the vicinity, such as gas or electric clothes washers and gas or electric water heaters. The strips are intended to detect moisture on the floor near a wall or baseboard and along runs of water pipes.

The invention also provides pads constructed in a similar manner as the first embodiment of the strips except for their size and shape; provided that, in a preferred embodiment the margins used for wicking moisture or for attachment purposes may, as needed, extend out from all sides of the pad such that a single margin would be employed around the perimeter of a round pad, as well as around the four edges of a generally rectangular pad. Also in this preferred embodiment one would not use a woven electric fence wire or strand wire in the pads, but instead would use an electrically conductive material such as aluminum window screen material or use the kind of mat disclosed in U.S. Pat. No. 6,731,215 to Harms et al. The pads are for placement directly underneath a sink or electrical appliance and are for detecting moisture on a floor area somewhat remote from a wall or baseboard. Preferably, the pads include a perforated, protective cover to prevent damage from impact by items that may fall upon the pads and will support household items such as cleaning supplies and waste baskets placed thereon while protecting the pad assembly underneath. The wires of the strips and/or pads are connected in parallel to the sensor inputs of a signal detection and transmission device that will cause emission of a visual and sound alert if moisture is detected by any of the pads or strips; in addition, means are provided to send a signal to a gas, water and/or electrical shutoff system, a home security system, or a wireless remote leak detector made for these systems that is capable of transmitting a radio signal indicating the presence of unwanted moisture. In some cases, it may be possible and appropriate to forgo the use of the signal detection and transmission device, and connect the wires from the strips and/or pads in parallel directly to sensor inputs of a gas, water and/or electrical shutoff system, a home security system, or a wireless remote leak detector made for these systems.

Advantages of my invention include the following:

Each strip is provided with oppositely-disposed first and second margins for wicking moisture towards the wires within the strips or for facilitating attachment to a floor, baseboard or other surface.

Each strip is flexible to bending all along its length and in all directions. This flexibility, in part, is due to the wires being kept free to move within the upper and lower layers. Once the strips have been cut to the required length for a particular use, the wires are attached to each strip, either at the end of the strip or at any point along the strip by uncovering the internal wires of the strip.

The small lateral cross-section of each strip in combination with the flexibility of each strip facilitates conducting each strip through narrow and confined places and through small openings; this means that the strips can be easily arranged to define a perimeter within which intruding water can be detected. This same flexibility facilitates attachment of the strips to water lines, such as by cable ties.

Where pads are placed in cabinets underneath sinks, during slow leak situations they can absorb water and protect the bottom of the cabinet for a limited amount of time. In an especially preferred embodiment, each pad further includes a moisture absorbent underlayer to absorb moisture that may leak through the upper layers with a nonpermeable base sheet underneath in order to protect the base of the cabinet from moisture damage until such time as a saturation point is reached with the absorbent underlayer and it can no longer retain additional fluids.

DETAILED DESCRIPTION

Figure 1A:
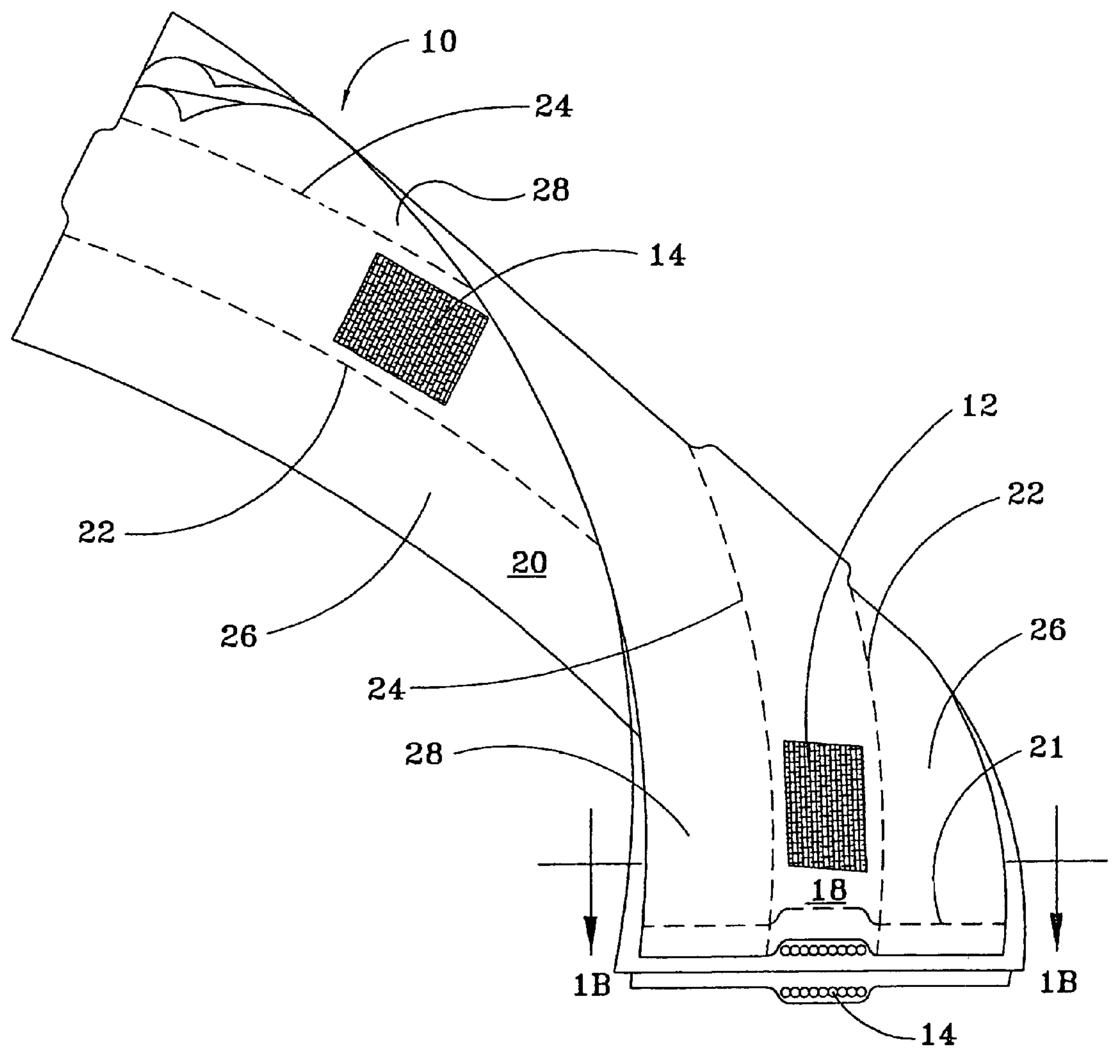
FIG. 1A is a perspective view of a first embodiment of a moisture sensing strip of my invention.
Figure 1B:
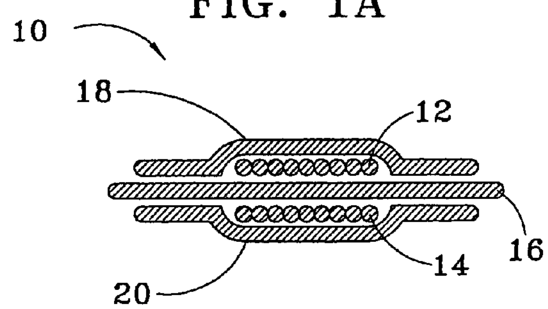
FIG. 1B is a cross-sectional view taken along line 1B-1B of FIG. 1A.

Referring to FIGS. 1A and 1B, a first embodiment of my moisture sensing strip 10 is shown as comprising an upper wire 12 and a lower wire 14 separated by a nonconducting layer 16. Since the strips must be flexible and durable, the wires 12, 14 must be flexible and durable. A preferred kind of wire is woven electric fence wire such as Electro-Web Poly-Tape manufactured by J. L. Williams Company of Meridian, ID, but copper, aluminum or stainless steel strand wire and other kinds of flexible wire can also be used. An upper, nonconducting layer 18 overlies the upper wire 12 and a lower, nonconducting layer 20 underlies the lower wire 14. The layers 18, 20 can be any woven or nonwoven, water absorbent material, which may be woven fabric or Kimberly Clark's shop towels. Also suitable for this purpose is the spunbonded polyester of a commercial weed barrier manufactured by Easy Gardener Products, Ltd., of Waco, Tex. The first embodiment further includes a middle layer 16, which can be made of any woven or non-woven material with sufficient wicking capabilities, such as Kimberly Clark shop towel material. The spunbonded polyester does not fall into this category and therefore should not be used where a wicking action is sought. The upper layer 18 is attached to the middle and lower layers 16, 20 by suitable attachment means; preferably, the attachment means is two lines of stitches 22, 24 disposed along opposite edges of the upper and lower wires 12, 14 to hold the wires in fixed relation with respect to each other and with respect to the strip 10. One end of the upper and lower wires 12, 14 are attached to the same end of the non-conducting layers 16, 18, and 20 by a suitable attachment means, preferably again as a laterally-directed line of stitches 21, to prevent the wires from sliding out of the strip or otherwise shifting, such as in an environment where vibration may be present after being installed on a marine vessel. The upper and lower layers are sufficiently wide that the strip 10 includes a border area or margin 26 comprised of the upper, middle and lower layers 18, 16, 20 for attachment to a baseboard and an opposite border 28 area for wicking moisture from a floor area toward the upper and lower wires. In a preferred embodiment, the margin of the middle layer 16 should be equal to or slightly greater than the margins formed by the upper and lower layers 18, 20. Each margin may be used as both an attachment and a wicking surface. The strips 10 are easily attached to floors, walls, cabinetry, appliances or other structures as needed using any system of attachment including, but not limited to, weights, tape, pins, nails, magnets, cable ties, hook-and-loop fasteners such as Velcro, and thumb tacks. Thus, when an electric voltage is applied across remote ends of the wires 12, 14, and moisture is wicked to the wires from a floor or other moist area at any place along the strip 10, this will permit electric current to flow through the wires, thereby creating an electrical signal that can induce an audible alarm or initiate actions to shut off the water supply or for other purposes, as discussed below. Pads 46, according to the invention, are strips that are constructed in a substantially similar manner as either the moisture strip 10 of the first or a second embodiment of a moisture strip 100 (described below), but, unlike the strips 10, 100, each pad includes an attachment/wicking margin that extends all the way around the periphery of the pad, and a pad may include additional components, as discussed below. The lateral and longitudinal extents of each pad 46 are more or less comparable, wherein the longitudinal extent is measured in the direction of the wires 12, 14 (or wires 112, 144, see below) therein and the lateral extent is measured in a direction normal thereto; that is, the ratio of the lateral extent to the longitudinal extent is in the range 0.2 to 5, depending upon the dimensions of the area to which the pad will be applied.

Figure 6:
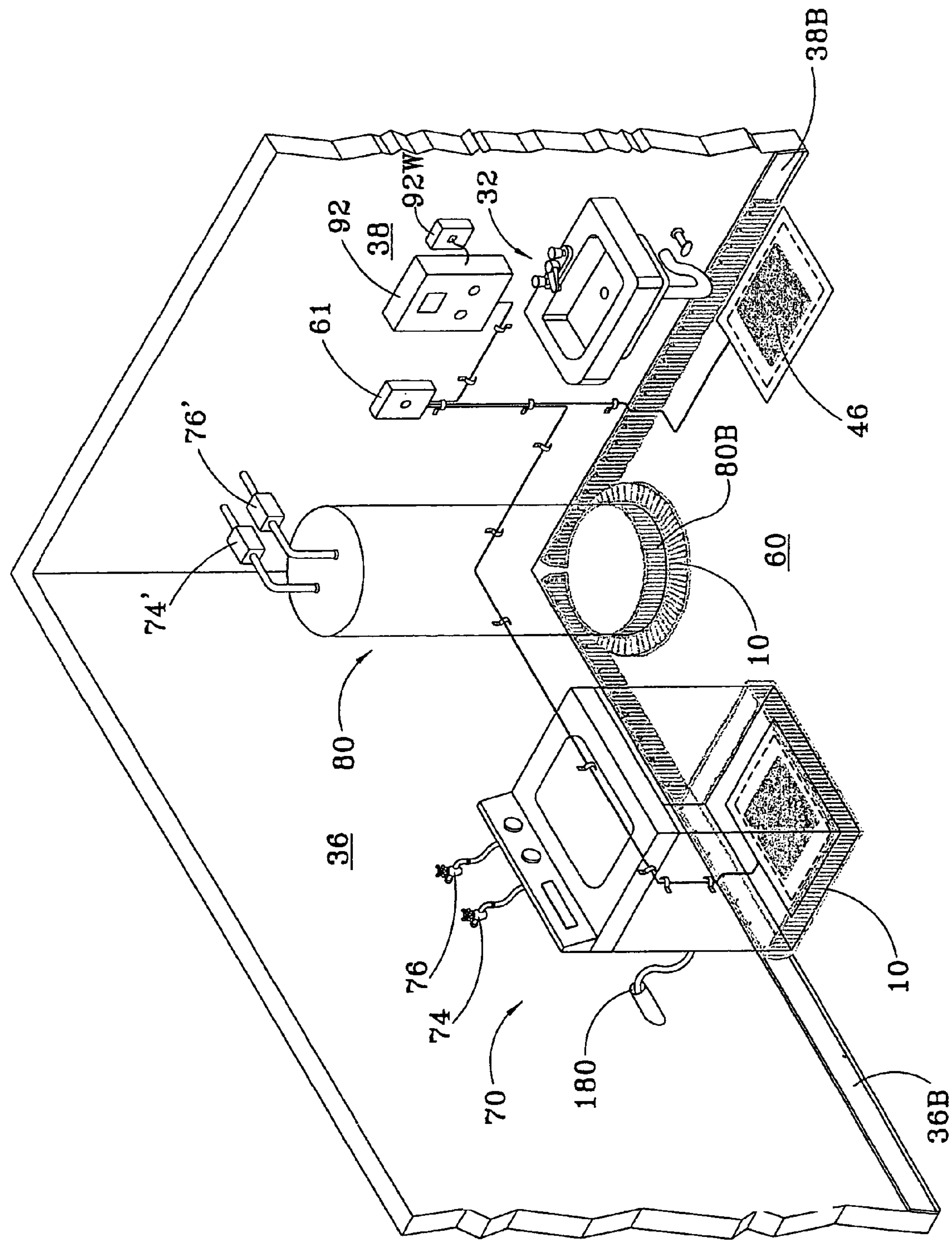
FIG. 6 is a top perspective view thereof showing the moisture sensing strips and pads wired directly into a wireless leak detection unit that is subsequently wired to a response unit that could be part of a home security system.
Figure 8:
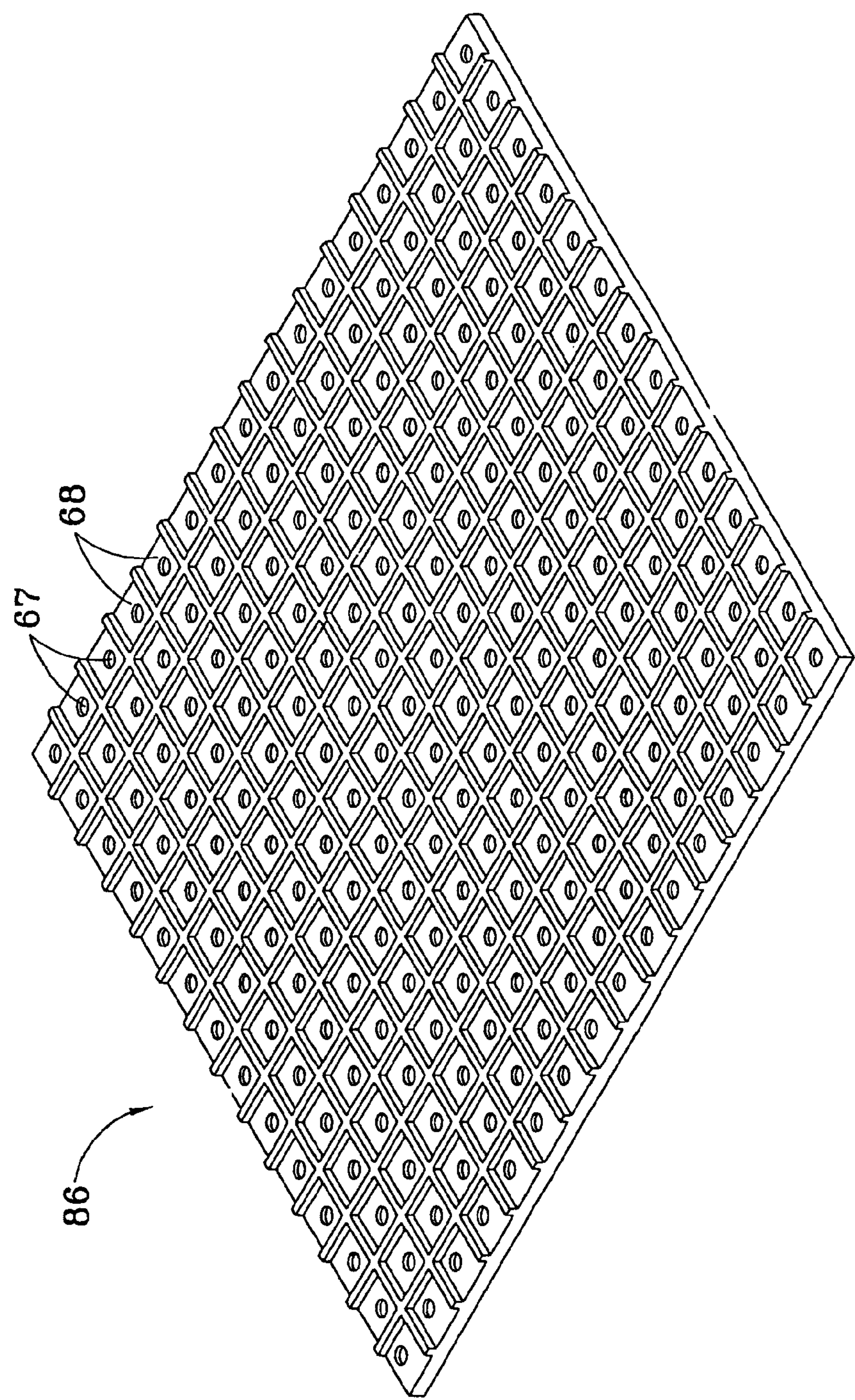
FIG. 8 is a top perspective view of a protective cover for a moisture sensing pad.

It is desirable to overlay the pads 46 with covers to protect them from damage from falling objects and to support household items such as cleaning supplies and waste baskets placed thereon while protecting the pad assembly underneath. An example of such a protective cover 86 suitable for placement over the pad 46 located underneath the sink 32 in FIG. 6 is shown in FIG. 8. The cover 86, as depicted, is a flat sheet having a plurality of drain apertures 67 to permit moisture to trickle down onto the pad 46 underneath. Preferably, an upper surface of the cover 86 is in the form of an orthogonal, ribbed matrix defining a plurality of spaces 68 for temporary accumulation of dripped moisture, each space having at least one drain aperture 67. The cover 86 may be made of any material that is suitably impact-resistant, durable and economical for the purpose, for instance—plastic, natural rubber, synthetic rubber or nylon. Nylon and polyethylene meshes can be used as a cover 86, and are available from InterNet, Inc., of Anoka, Minn.

Figure 9:
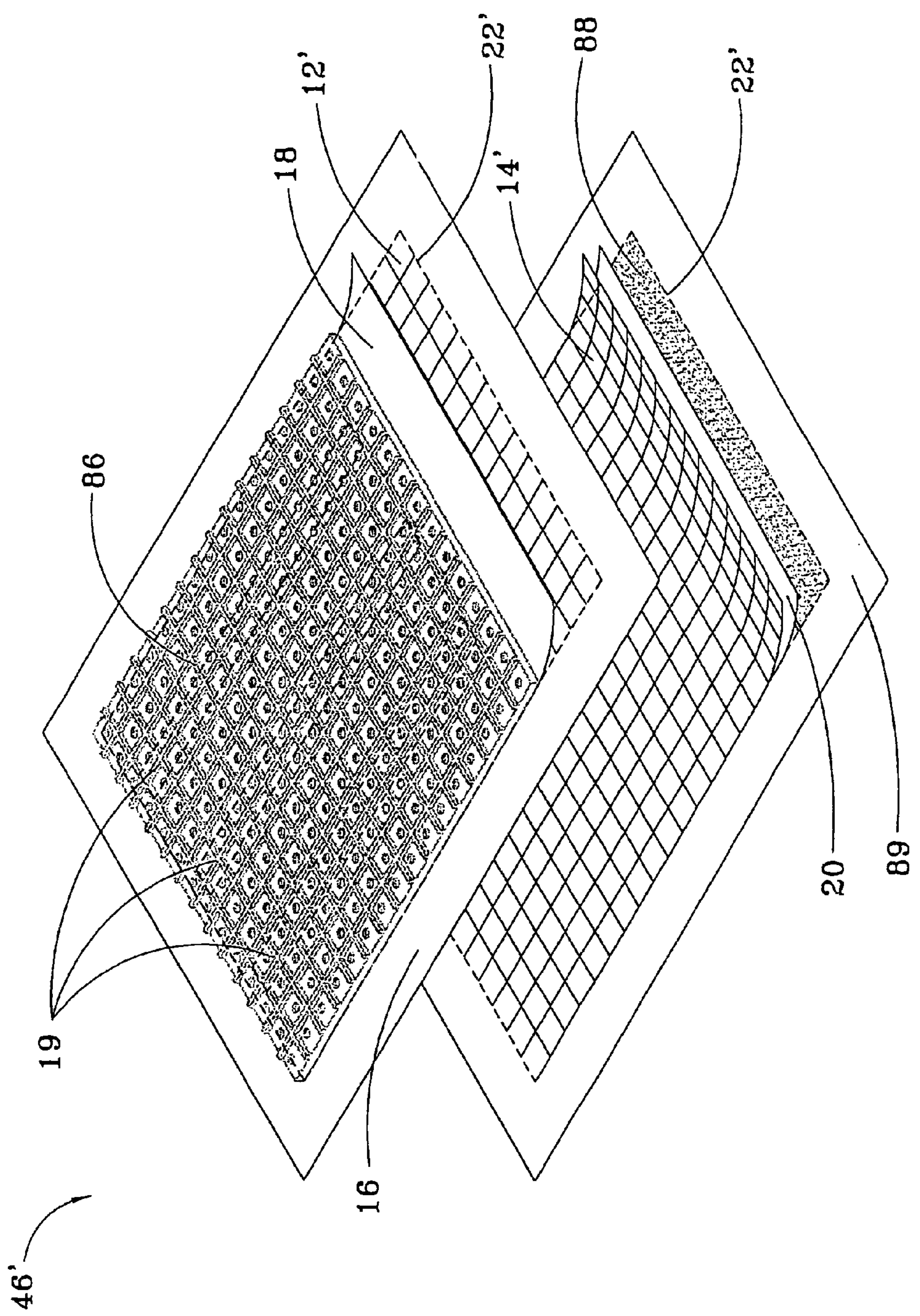
FIG. 9 is an exploded, perspective view of an alternative embodiment of a pad.

An alternative embodiment of a pad 46' incorporating a protective cover 86 adhered by adhesive strips 19 to an upper layer 18 is depicted in FIG. 9, which further includes a moisture absorbent layer 88 disposed underneath the lower layer 20, and a moisture-impermeable base sheet 89 disposed underneath the moisture-absorbent layer 88. The moisture-absorbent layer 88 could be formed of one or more layers of shop towel, available from Kimberly-Clark of Roswell, Ga., for example. The impermeable base sheet 89 can be cut to size from commercially available rolls of acetate or mylar film. The upper wire 12' and the lower wire 14' of the pad 46' are screen versions of the upper and lower wires 12, 14 of the previously described strip 10. Continuous stitching 22' around the periphery of the pad 46 serves the same purpose as stitching 22, 24 of the previously described strip 10. If the pad is rectangular and has four edges, for instance, then there would be stitching 22' along all four edges—i.e., two longitudinal edges and two lateral edges—thereby forming an attachment/wicking margin on each side of the pad. Also, with the pad version, stitching line 21 described in strip 10 is not needed as the upper and lower wires 12', 14' are held in place between the nonabsorbent layers 18, 16, 20 by stitching 22' around the periphery of the pad. Additional adhesive strips could be included in the pad 46' between layers 20 and 88 and between layers 88 and 89, as well as on the underside of base sheet 89.

Figure 2A:
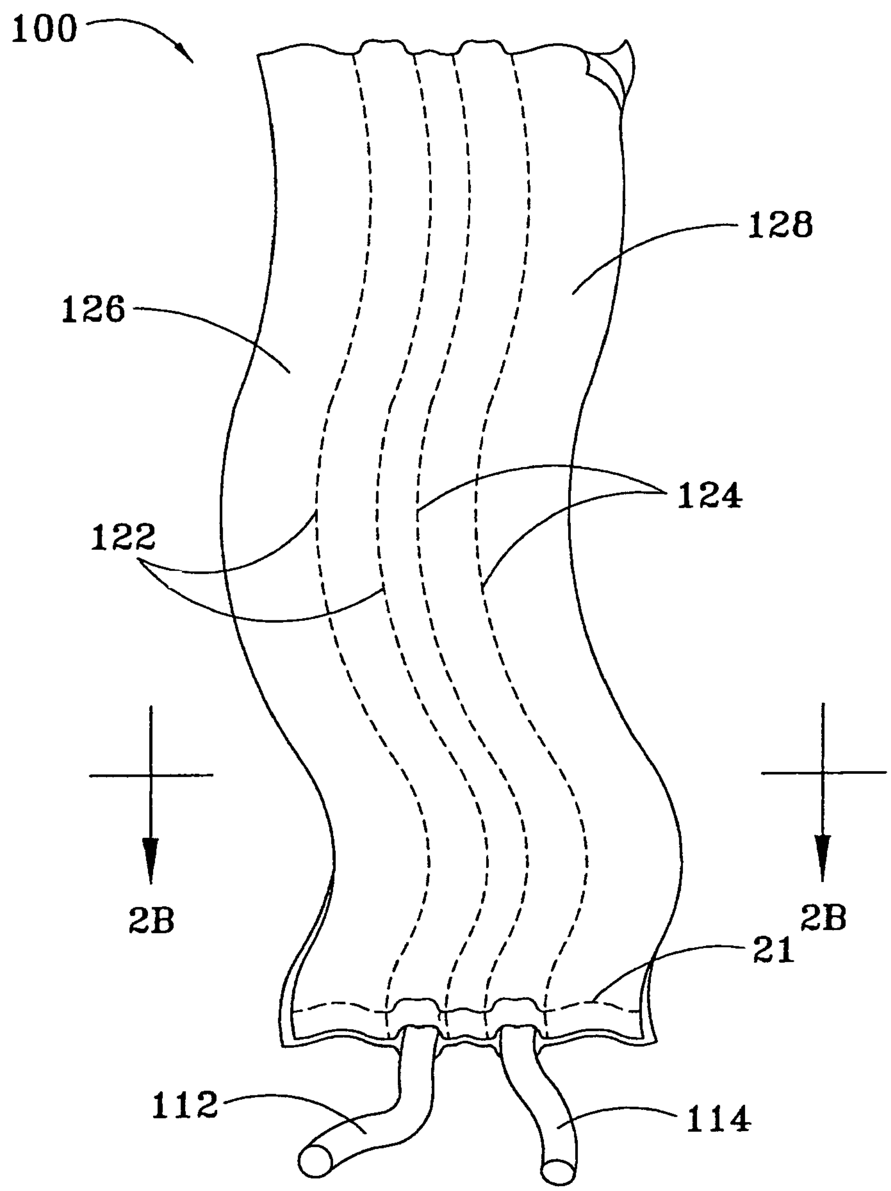
FIG. 2A is a perspective view of a second embodiment of a moisture sensing strip of my invention.
Figure 2B:
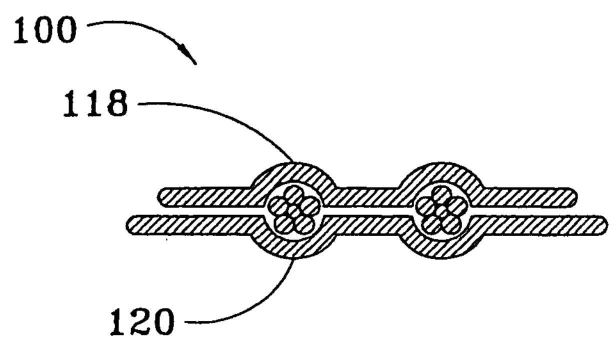
FIG. 2B is a cross-sectional view taken along line 2B-2B of FIG. 2A.

Referring to FIGS. 2A and 2B, a second, alternative embodiment, of my moisture sensing strip 100 is shown to comprise a parallel pair of laterally spaced-apart wires 112, 114, an upper nonconductive layer 118 that overlies the wires, and a lower nonconductive layer 120 that underlies the wires. Again, the wires 112, 114 must be durable and flexible and are preferably braided electric fence wire (such as the Electro-Web PolyWire manufactured by J. L. Williams Company of Meridian, Id.) or copper, aluminum or stainless steel strand wire. Other suitable wire, for instance, is Baygard ¼" electric rope manufactured by Parker-McCrory Mfg. Co. of Kansas City, Mo., which is a fibrillated polyethylene electric rope having stainless steel conductor wires. The upper and lower layers 118, 120 are preferably woven or nonwoven, water absorbent material (i.e., woven fabric or Kimberly Clark's shop towels) that is suitable for wicking purposes on one layer and spunbonded polyester on the other layer to provide tear-resistant strength. The upper layer 118 is attached to the lower layer 120 by suitable means, preferably by parallel lines of stitching 122, 124 along the opposite sides of each of the two wires 112, 114. The upper and lower layers 118, 120 are wide enough to form a border area or margin 126 for attaching the strip to a baseboard or other support member and an opposite margin 128 for placement on the floor 60 to wick moisture toward the wires 112, 114. Either margin 126, 128 may be used for attaching a strip 10 to a surface or for wicking moisture. One end of each of the two wires 112, 114 is attached to the same end of the nonconducting layers 118, and 120 by a suitable attachment means, preferably again, as a line of stitches 21, to prevent the wires from sliding out of the strip or otherwise shifting, such as in an environment where vibration may be present after being installed on a marine vessel.

Figure 3:
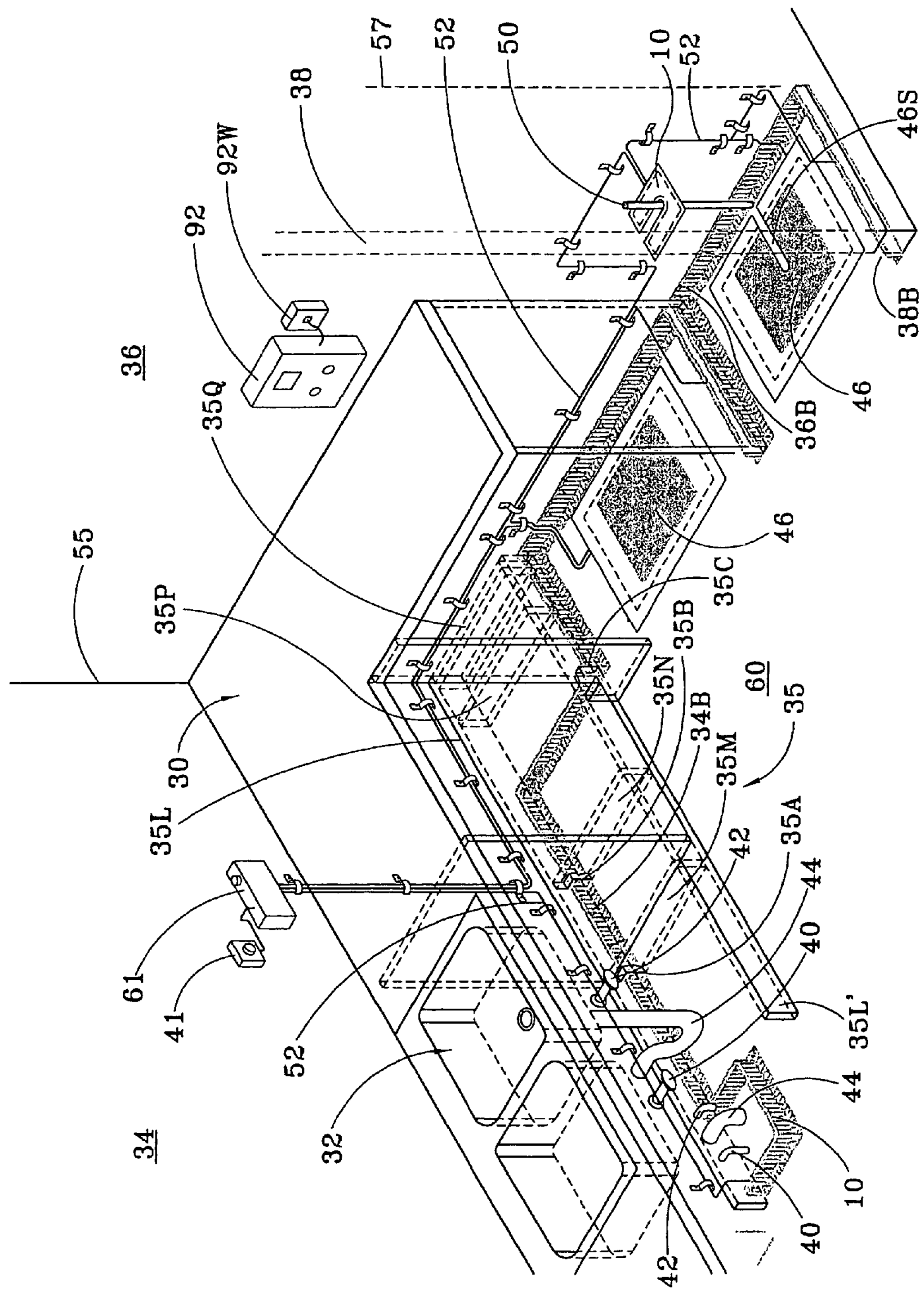
FIG. 3 is a perspective view of a corner portion of a room with plumbing fixtures in which moisture sensing strips and pads of my invention have been installed.

Referring to FIG. 3, a corner portion of a room is shown comprising a left wall 34 that adjoins a left end of a rear wall 36 at a first corner 55 and a right wall 38 that adjoins a right end of the rear wall at a second corner 57. The right wall 38 is shown in phantom outline for clarity. At the level of the floor 60 of the room a rectangular pedestal 35 is aligned adjacent to a lower end of the left wall 34 and supports an overlying corner cabinet 30 that houses a sink 32. The pedestal 35 includes a laterally spaced-apart pair of longitudinal members 35L, 35L' parallel to the left wall 34 joined by longitudinally spaced-apart cross members 35M, 35N, 35P, 35Q disposed normal to the left wall 34. A rear portion of the cabinet 30 extends from the corner 55 part way across the rear wall 36, and a rear baseboard 36B extends the rest of the way across a lower end of the rear wall 36. A right baseboard 38B extends across a lower end of the right wall 38. Plumbing fixtures below the sink 32 include a hot water supply 40, a cold water supply 42 and a waste water discharge pipe 44. An upstanding water supply pipe 50 is shown adjacent the right rear wall 36 near the right wall 38, which may be a water supply for a refrigerator with ice maker (not shown). A moisture sensing strip 10 extends inside the cabinet pedestal 35 along the floor 60 adjacent the hot and cold water supplies 40, 42 and the waste water discharge pipe 44 under the sink 32. The strip 10 further extends along the interior of the pedestal 35, through an opening 35A in cross member 35M, through an opening 35B in cross member 35N, through an opening 35C in longitudinal member 35L', thence along a longitudinal member 35L', along a lower, rear, interior portion of the rear of the cabinet 30 toward and along the baseboard 36B of the rear wall 36 and behind the upstanding water pipe 50, thence along the same baseboard 36B and along the baseboard 38B of the right wall 38. A moisture sensing pad 46 for an in-cabinet dish washer (not shown) and its hot water line (not shown), and waste water discharge line (not shown), is placed on the floor 60 within the cabinet 30 adjacent the rear wall 36 of the room and another pad 46 is placed on the floor just in front of the upstanding pipe 50. The latter pad 46 has a slot 46S directed toward the rear wall 36 to receive and substantially surround the pipe 50. Alternatively, a strip 10 could be wrapped around the pipe 50 to detect any leaks running down the pipe from above. The moisture sensing strips 10 and pads 46 are wired in parallel by pairs of insulated electric wires 52 and are connected to input jacks J4 through J8 of an interface unit 61, as diagrammed in FIGS. 3 and 4. Thus, when moisture is wicked to short the wires 12, 14 in the strips 10 and/or the electrically-conductive screens 18, 20 in the pads 46, one or more light emitting diodes (LEDs), denoted as D8, D9, D10, D11, D12, and a piezoelectric buzzer BZ1 attached to jack J2 are energized to provide visual and audible alarms of a water leak, respectively. In addition, a relay RLY1 having a normally closed common contact and a normally open contact is energized to activate a wireless remote leak detector 67 and/or a home security system 92 attached to jack J3; that is, tripping of the relay RLY1 due to a moist strip 10 and/or a pad 46 shorting one or more of input jacks J4 through 38 will cause the wireless remote leak detector 67 to emit a radio signal through its antenna 67A, forcing the security system 92 into alarm mode, or in the case of a home security system 92 hard wired (see FIG. 6) to jack J3 will cause it to react accordingly. A suitable home security system is available from the Skylink Group of Ontario, Calif. The interface unit 61 is powered by a 9 volt battery inserted into a battery compartment and connected to jack J1. Pin 2 of J1 is grounded and pin 1 thereof serves as a positive voltage source for the points of the electronic circuitry within the interface unit 61 that are labeled as "+9v." Wired in series in a forward-current direction with each of the LEDs D8 through D12 is a PN4249 transistor; these transistors are denoted Q3 through Q7, respectively. The base of each of the transistors Q3 through Q7 is wired to a pin 1 of the corresponding input jack J4 through J8 through resistors R9 through R12 and R16, respectively. The bases of the LEDs are all wired in parallel to a +9 volt source through pull-up resistor R14. Thus, transistors Q3 through Q7 act as valves to permit current to flow through the LEDs and the LEDs to emit light if, and only if, the corresponding input jack (J4 through J8) is electrically shorted to ground. Light emission from any one of the LEDs D8 through D12 informs the user as to the general location of a leak; that is, one has only to label the wires during installation or trace back from the input jack associated with the lit up LED to the strip 10 or pad 46 that is in electrical contact with that jack to know that the leak is somewhere in the vicinity of that strip or pad.

A short across one or more of the input jacks J4 through J8 also trips the relay RLY1 as follows. The coil of the relay RLY1 is wired in series with a +9 volt source through the collector terminal of a TIP42 pnp power transistor, denoted Q2, which source is connected to the emitter terminal thereof. A positive voltage is also applied to the base terminal of transistor Q2 from a +9 volt source through resistors R14 and R18. Transistor Q2 permits current to flow through the coil of relay RLY1 to ground if and only if the voltage applied to the base of transistor Q2 through resistors R18 drops due to current drain through one or more of the LEDs D8 through D12 when a short occurs across an input jack (J4 through J8) as a result of a leak; the relay RLY1 can also become energized due to current drain through LED D3 as a result of a low-battery condition, as described below.

The interface unit 61 also provides an audible and visual warning of a low battery condition. Referring to the upper left quadrant of FIG. 4, the interface unit 61 includes a two-stage low voltage alarm system that uses a reference voltage diode and two of the four operational amplifiers built into a Dallas Semiconductor MAX934 integrated circuit, denoted U1. The two operational amplifiers operate independently of each other. Their purpose is to signal two separate low battery conditions, with the first stage (upper operational amplifier) triggering after the battery power supply 66 drops below 8 volts, and the second stage (lower operational amplifier) triggering after the battery power supply drops to approximately 6.7 volts. The power supply voltage trip points are determined by resistor pairs R15/R3 and R1/R2 combined with the hysteresis resistor feedback through resistors R5 and R23, respectively. On the associated operational amplifier, the hysteresis resistor forces the output voltage to snap to ground when the trip point is reached, rather than allowing the operational amplifier output voltage to gradually decrease as the power supply voltage drops. The hysteresis resistors do this when the output of the respective operational amplifiers (pins 1 and 2) has finally dropped lower than the voltage provided by the corresponding resistor pairs. This pulls the voltage on the '+' inputs (pins 5 and 7) further down, which in turn forces the operational amplifier output voltage even lower, which pulls the '+' input further down, et cetera, creating an instantaneous cascading feedback loop. The difference between the trip points of these two operational amplifier circuits is intended to give the owner time to come into audible/visual range and react to the first alarm condition before the second circuit is triggered, which, if connected, will set off a home alarm and/or a water supply cut-off system.

To detect a low battery condition, each operational amplifier must compare the '−' input voltage from the reference diode (denoted REF, pin 8) against a voltage derived from the power supply 66 through resistor pairs R15/R3 and R1/R2, respectively. Because the reference voltage is nominally 1.182 volts, the resistor pairs are used to provide a voltage signal that is a small percentage of the actual power supply voltage. The values used for each pair of resistors are set so that the first stage triggers before the second stage. The first stage '+' input voltage (pin 5) will eventually drop to the same value as the reference voltage on the '−' input (pin 4), triggering the circuit. When this happens, the output of the operational amplifier (pin 2) will be forced to ground, allowing current to flow through diode D4 and piezoelectric buzzer BZ1. Diode D2 blocks the voltage drop (and the resulting potential current) from reaching the power transistor Q2, preventing the relay (RLY1) from energizing. Conversely, this same diode allows current to pass through in the opposite direction when the second stage low voltage sensor transistor Q1 or any of the leak sensor transistors (Q3 through Q7) are triggered. This allows them to not only energize the relay RLY1 via the power transistor Q2, but also generate a current flow through the piezoelectric buzzer BZ1. After the first stage triggers, if the battery 66 is not replaced, the power supply voltage will continue to drain down and eventually the voltage at the second stage '+' input (pin 7) will drop to the same value as the reference voltage on the '−' input (pin 6). This will force the second stage output to transition to ground, allowing current to flow through diodes D3 and D2 and the piezoelectric buzzer BZ1.

The first stage functions like most home smoke alarm systems under a low battery condition, creating an audible chirp from piezoelectric buzzer BZ1, approximately every 20 seconds, and causing the in-line diode D4 to blink at the same time. When the supply voltage drops below 8.0 volts the circuit triggers and the operational amplifier generates a periodic low voltage pulse. Capacitor C1 and diode D1 both connected to pin 4, and resistor R6 which joins diode D1 to pin 2 and to diode D4, are included in this circuit to create this output pulse, and thus, the chirping sound from BZ1. When the first stage triggers, the output of the operational amplifier (pin 2) goes to ground and the diode D1 allows the operational amplifier output to rapidly discharge capacitor C1 through resistor R6. Discharging capacitor C1 also forces the '−' input (pin 4) to ground, and once again below the voltage level of the '+' input (pin 5). This forces the output of the operational amplifier (pin 2) to immediately return to a high voltage state. Now, diode D1 blocks the current from flowing in the opposite direction, preventing the capacitor C1 from recharging using the voltage from the operational amplifier output (pin 2). Instead, the capacitor C1 slowly charges back up from the voltage reference diode (REF) via resistor R4. After about 20 seconds the '−' input voltage (pin 4) will finally rise above the '+' input voltage (pin 5), and the cycle then repeats until the battery is removed or drops to a voltage where the circuit fails to operate.

Figure 4:
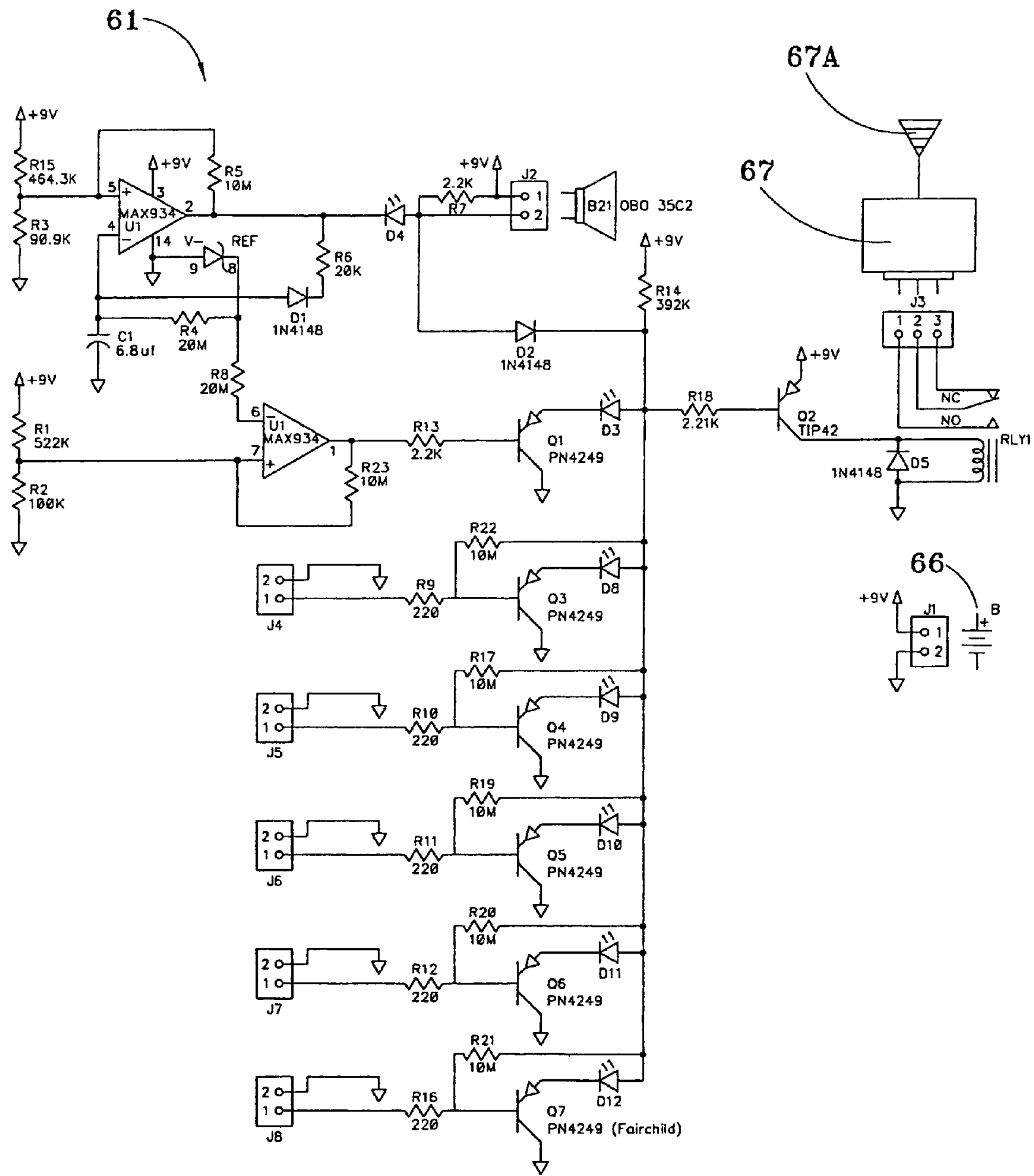
FIG. 4 is an electric circuit schematic for receiving electric signals from the moisture sensing strips and pads when moisture is detected and to emit an audible alarm and/or to relay the signals to a wireless remote leak detector and/or to a home security system.

The second stage is implemented by the lower of the two operational amplifiers as diagrammed in FIG. 4. Unlike the first stage, when the circuit triggers the operational amplifier output voltage on pin 1 snaps to ground (using hysteresis resistor R23) and stays there, energizing both the relay RLY1 and the piezoelectric buzzer BZ1 until the battery 66 is removed or drops to a voltage where the circuit fails to operate. Pins 10, 11, 12, 13 and 15 of U1 are unused.

Figure 5:
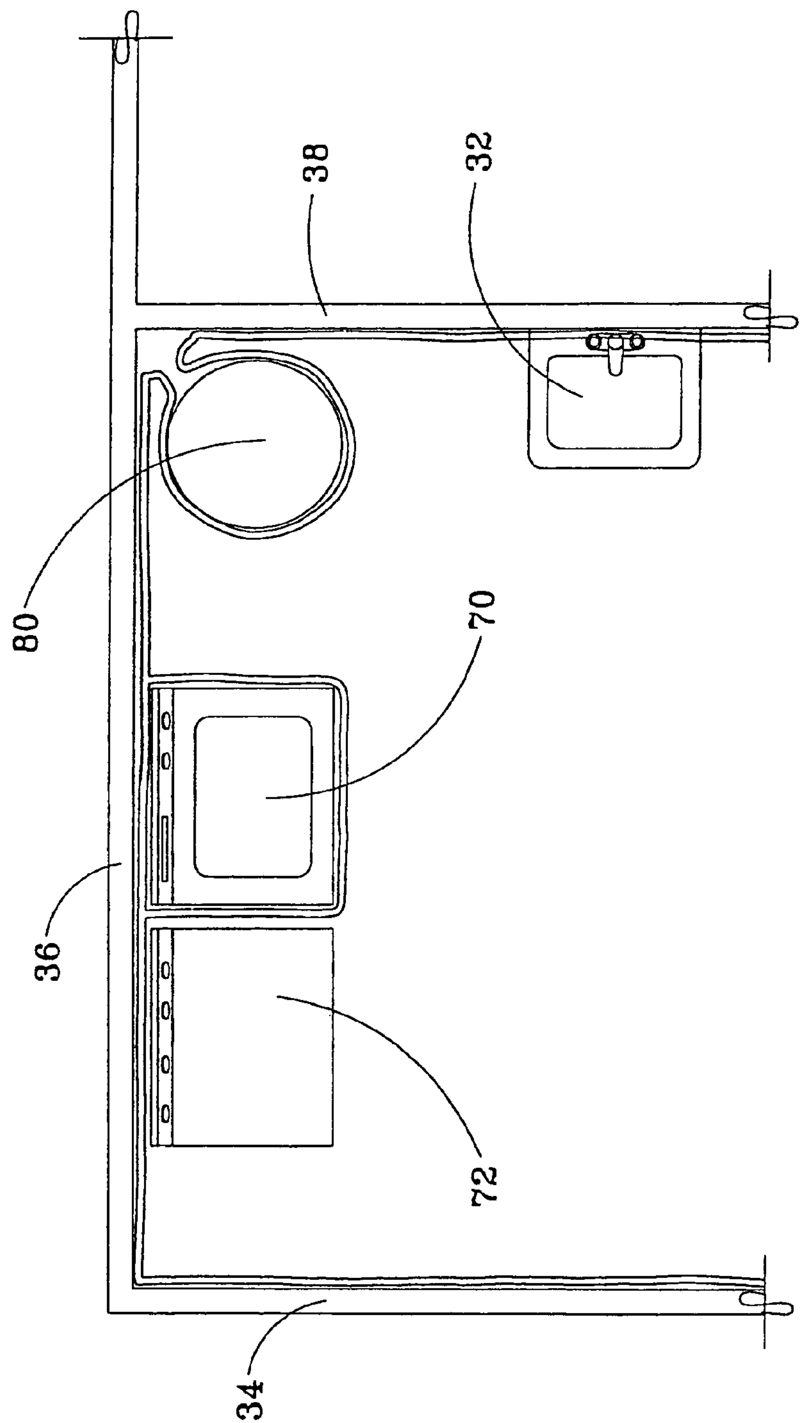
FIG. 5 is a plan view of a utility room containing a hot water tank in which moisture sensing strips and pads have been installed.

FIGS. 5 and 6 depict a portion of a room that is partially enclosed by a left wall 34, a rear wall 36, and a right wall 38. The room contains a clothes washing machine 70 and clothes dryer 72 adjacent the rear wall 36, a hot water tank 80 in a corner location, and a sink 32 adjacent the right wall 38. A moisture sensing strip 10 is shown surrounding the washing machine 70 at floor level, thence along the baseboard 36B of a rear wall 36, around the circular base 80B of the hot water tank 80, thence along the baseboard 38B of the rear wall 38. The washing machine is attached by hoses to a hot water supply 74 and a cold water supply 76. The hot water tank 80 is attached to a hot water supply 74' and a cold water supply 76'. A moisture sensing pad 46 lies on the floor 60 underneath the sink 32 and is wired to the strip 10 and to an interface unit 61 which in turn is hard wired to a home security receiver. Alternatively, the strips 10 and/or pads are wired to a home security system 92 mounted in the vicinity of the washing machine 70 or hot water tank 80, such as on the right wall 38. This security system is shown to be plugged into an adjacent phone jack 92W for dial-out capability to a home security service when the strip 10 or pad 46 signals a moisture leak and places the security system 92 into alarm mode.

Figure 7:
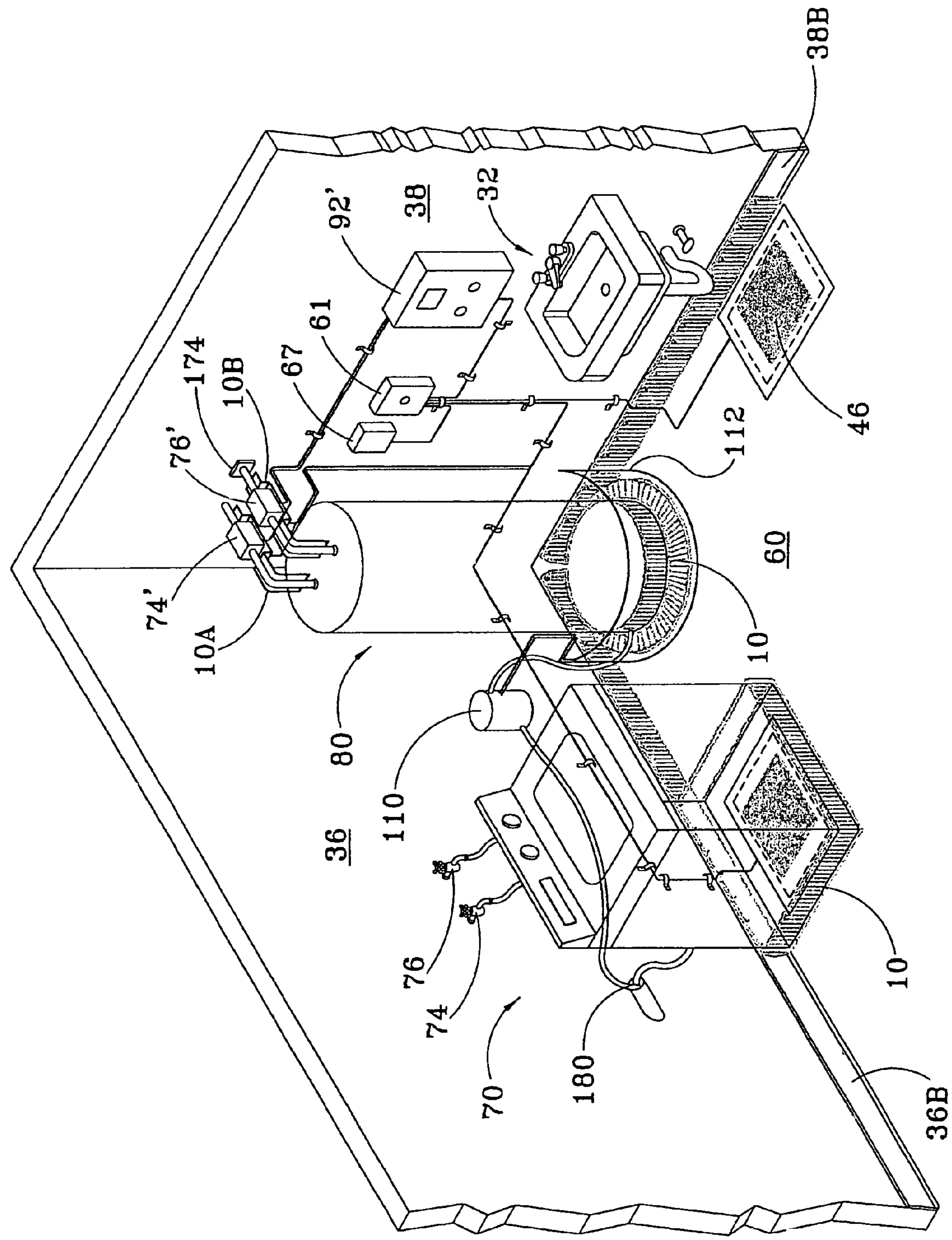
FIG. 7 is a schematic view of a system for use in conjunction with an emergency water/gas/electricity shutoff system that turns on a sump pump if the container vessel of a gas or electric hot water tank begins to leak.

As shown in FIG. 7, in an alternative system, a 30 ampere relay breaker box 92' is connected to the relay of interface unit 61. Interface unit 61 receives inputs from the moisture sensing strips 10, 10A, 10B and pads 46. A water level sensing tray 112 surrounds the base of the hot water tank 80 at floor level to contain any water that may leak from the tank or from associated pipes. Strips 10A and 10B are connected to the water lines via suitable fasteners such as cable ties. On horizontal water lines, the strips 10 should be attached to the undersides of the lines; on vertical water lines, the strips 10 can be wrapped around the lines in barber pole style, or alternatively, the margins 26, 28 can be made wide enough to wrap all the way around the line when attached with cable ties. A relay (not shown) in the relay breaker box 92 is normally closed to permit a solenoid-actuated water valve 174 in the cold water supply to the hot water tank 80 to remain open, but the valve closes when an input voltage from the strips 10, 10A, 10B or pad 46 is received due to presence of moisture and causes the relay in the relay breaker box 92 to open, causing the associated breaker to also open and deenergize the water valve 174, shutting off the cold water supply to the hot water tank 80. At the same time, a normally open contact of another breaker in the relay breaker box 92 closes, which energizes a water pump 110 to pump water out of the tray 112 to a washing machine drain 180. The relay breaker box 92 may have additional breakers and/or relays to shut off power to the electric water heater tank 80, or to deenergize a normally open valve in a gas-powered, hot water tank 80; or, the relay breaker box 92 may be used to shut off electric power to a tankless water heater (not shown).

As an alternative to the relay breaker box 92, the interface unit 61 could be attached to the wireless transmitter 67 of a Water Cop water pressure shutoff system manufactured by DynaQuip Controls of St. Clair, Mo.; see FIG. 7. The Water Cop system has a wireless receiver as part of its water shutoff valve 174. When a water leak is detected, the wireless transmitter 67 is notified by the closing of the common and normally open contacts of relay RLY1 in interface unit 61. The wireless transmitter 67 then sends a radio signal to the receiver on the water valve 174, and it then closes the water valve on the inlet water supply line 76.

Various changes and modifications will become obvious to those skilled in the art. It is the intent that these changes and modifications are to be encompassed within the spirit of the appended claims and that the invention described herein and shown in the accompanying drawings is illustrative only and not intended to limit the scope of the invention.

The invention claimed is:

1. A moisture sensing pad for monitoring water intrusion into an area, comprising:

a first flexible, electrically-conductive wire, said wire having a first edge and a laterally-opposite, second edge;

a second flexible, electrically-conductive wire disposed below and parallel to the first wire, said wire having a first edge and a laterally-opposite, second edge;

a nonconductive, water-permeable upper layer that overlies the wires and becomes conductive when wet, said upper layer having laterally opposite outer margins;

a nonconductive, water-permeable lower layer that underlies the wires and becomes conductive when wet, said lower layer having laterally opposite outer margins;

a water-permeable, nonconducting middle layer disposed intermediate the first and second wires that becomes conductive when wet, said middle layer having outer margins that extend laterally, slightly beyond the laterally opposite outer margins of the water-permeable upper and lower layers in order to facilitate direct contact with water intruding into the area being monitored;

a means for attaching the upper, lower and middle layers to one another, said means extending around the entire periphery of the pad;

a protective cover comprised of one or more of plastic, natural rubber, synthetic rubber or nylon that overlies the upper layer, said cover having a plurality of apertures to permit any liquid that may collect on an upper surface of the cover to trickle down onto the layers of the pad below;

a water-absorbent layer underneath the lower layer; and a water-impermeable base sheet underneath the absorbent layer;

wherein the ratio of the lateral extent of the pad to the longitudinal extent of the pad is in the ratio 0.2 to 5, and the middle layer extends away from the first edges of the wires in a first lateral direction to form a wicking margin capable of wicking moisture toward the wires and extends away from the second edges of the wires in a second, opposite lateral direction to form an attachment margin by which the pad may be attached to a baseboard, floor or other surface in the vicinity of which it is desired to detect the presence of moisture.

2. The pad of claim 1, wherein the means for attaching the layers to one another is a series of stitches and further comprising an attachment/wicking margin formed by the nonconducting layers as defined by the stitching adjacent to the periphery of the pad.

3. A leak detection system, comprising:

a d.c. electric source, said source being adapted to provide electric current to the system at a source voltage that lies between a first, upper voltage threshold and a second, lower voltage threshold;

one or more moisture sensing strips, each moisture sensing strip including a first flexible, longitudinally-extended electrically-conductive wire, said wire having a first edge and a laterally-opposite, second edge;

a second flexible, longitudinally-extended electrically-conductive wire, said wire having a first edge and a laterally-opposite, second edge;

a nonconductive, water-permeable upper layer that overlies the wires and becomes conductive when wet;

a nonconductive, water-permeable lower layer that underlies the wires and becomes conductive when wet; and a water-permeable, nonconducting middle layer disposed intermediate the first and second wires that becomes conductive when wet, extending laterally, slightly beyond the laterally opposing outer margins of the water-permeable upper and lower layers in order to facilitate direct contact with water intruding into an area being monitored;

means for attaching the layers one to another;

wherein at least one of the layers extends away from the first edges of the wires in a first lateral direction to form a wicking margin capable of wicking moisture toward the wires and at least one of the layers extends away from the second edges of the wires in a second, opposite lateral direction to form an attachment margin by which the strip may be attached to a baseboard, floor or other surface in the vicinity of which it is desired to detect the presence of moisture;

electric circuit means wired to said strips and powered by said source for emitting a visual and/or audible warning signal whenever moisture causes a short circuit between distal ends of the wires in said strips, said means including a plurality of input jacks, wired in parallel, for receiving and imposing a d.c. voltage across the proximal ends of the wires within each strip;

one or more light emitting diodes for emitting said visual warning signal;

a piezoelectric buzzer for emitting said audible warning signal;

an electrical relay means with normally closed contacts and normally open contacts that open and close, respectively, either in response to said source voltage dropping below the second voltage threshold, or in response to an electrical short of the distal ends of wires within one or more of the strips, whereby in response to such a short, any electrical device attached to the normally open contacts will be energized and any electrical device attached to the normally closed contacts will be deenergized;

wherein said piezoelectric buzzer is off when subjected to an applied power supply voltage equal to or in excess of said first threshold voltage, emits a chirping sound when said source voltage lies within a voltage range that is less than the first voltage threshold and greater than the second voltage threshold, and emits a continuous tone and trips the relay when said source voltage is below said second voltage threshold.

4. The system of claim 3, wherein at least one of said moisture sensing strips has latitudinal and longitudinal extent in the ratio 0.2 to 5, said at least one moisture sensing strip includes a said first wire that overlies and is parallel to a said second wire, and wherein the means for attaching the layers one to another extends around the entire periphery of the strip, thereby forming a moisture sensing pad, and said pad is wired to said electric circuit means and powered by said source for producing said electrical relay open and close signal transition and emitting said visual and/or audible warning signal whenever moisture causes a short circuit between said distal ends of the wires in said pad.

5. The system of claim 4, wherein the first threshold voltage is 8.0 volts and the second voltage threshold is 6.7 volts.

6. A moisture sensing strip for monitoring water intrusion into an area, comprising:

a first flexible, electrically-conductive wire, said wire having a first edge and a laterally-opposite, outer second edge;

a second flexible, electrically-conductive wire disposed parallel to the first wire, said wire having a first, inner edge and a laterally-opposite, outer second edge;

a nonconductive, water-permeable upper layer that overlies the wires and becomes conductive when wet, said layer having laterally opposite outer margins;

a nonconductive, water-permeable lower layer that underlies the wires and becomes conductive when wet, said layer having laterally opposite outer margins;

a means for attaching the layers to one another, said means including a series of stitches adjacent to the outer edges of the wires; and wherein both the upper layer and the lower layer extend laterally away from the edges of the wires to form oppositely-disposed margins and both margins are capable of wicking moisture toward the wires and both margins can be attached to a baseboard, floor or other horizontal, vertical or inclined surface in the vicinity of which it is desired to detect the presence of moisture;

wherein the first wire overlies the second wire;

and further comprising a water-permeable, nonconducting middle layer disposed intermediate the first and second wires that becomes conductive when wet, said middle layer having outer margins that extend laterally, slightly beyond the laterally opposite outer margins of the water-permeable upper and lower layers in order to facilitate direct contact with water intruding into the area being monitored.

* * * * *